United States Patent
Yu

(10) Patent No.: US 9,241,260 B2
(45) Date of Patent: Jan. 19, 2016

(54) KEY SHARING METHOD AND SYSTEM FOR MACHINE TYPE COMMUNICATION (MTC) SERVER

(75) Inventor: Wantao Yu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 163 days.

(21) Appl. No.: 13/978,967

(22) PCT Filed: Jun. 30, 2011

(86) PCT No.: PCT/CN2011/076677
§ 371 (c)(1),
(2), (4) Date: Jul. 10, 2013

(87) PCT Pub. No.: WO2012/094879
PCT Pub. Date: Jul. 19, 2012

(65) Prior Publication Data
US 2013/0290723 A1     Oct. 31, 2013

(30) Foreign Application Priority Data

Jan. 14, 2011 (CN) .......................... 2011 1 0008563

(51) Int. Cl.
*H04W 12/04* (2009.01)
*H04W 4/00* (2009.01)
*H04W 12/06* (2009.01)

(52) U.S. Cl.
CPC .............. *H04W 12/04* (2013.01); *H04W 4/001* (2013.01); *H04W 4/005* (2013.01); *H04W 12/06* (2013.01)

(58) Field of Classification Search
CPC .................................................. H04W 12/04
USPC ....................................................... 713/171
See application file for complete search history.

(56) References Cited

U.S. PATENT DOCUMENTS

| 2007/0234041 | A1 | 10/2007 | Lakshmeshwar et al. |
| 2008/0215888 | A1 | 9/2008 | Barriga et al. |

FOREIGN PATENT DOCUMENTS

| CN | 101087261 A | 12/2007 |
| CN | 101218800 A | 7/2008 |
| CN | 101455053 A | 6/2009 |

OTHER PUBLICATIONS

International Search Report in international application No. PCT/CN2011/076677, mailed on Oct. 20, 2011.

(Continued)

*Primary Examiner* — Jacob Lipman
(74) *Attorney, Agent, or Firm* — Oppedahl Patent Law Firm LLC

(57) ABSTRACT

The disclosure discloses a key sharing method for a Machine Type Communication (MTC) server, wherein when establishing a safe connection and performs safe communications with a first MTC server via a Generic Bootstrapping Architecture (GBA) process, an MTC device may send a second MTC server a request message containing a bootstrapping identifier (B-TID) currently used by the MTC device and the first MTC server and a host identifier $NAF\text{-}ID_1$ of the first MTC server; the second MTC server sends a Bootstrapping Server Function (BSF) an authentication request containing a host identifier $NAF\text{-}ID_2$ of the second MTC server, the B-TID, and NAF-ID; after verifying the validity of $NAF\text{-}ID_2$ and $NAF\text{-}ID_1$, the BSF generates a session key $K_{NAF}$ according to the B-TID and the $NAF\text{-}ID_1$, and sends the generated $K_{NAF}$ to the second MTC server. Accordingly, the disclosure further discloses a key sharing system for an MTC server. With the disclosure, the MTC device is enabled to perform safe communications simultaneously with a plurality of MTC servers, thereby enhancing the efficiency of network resources.

15 Claims, 4 Drawing Sheets

(56) References Cited

OTHER PUBLICATIONS

English Translation of the Written Opinion of the International Search Authority in international application No. PCT/CN2011/076677, mailed on Oct. 20, 2011.

3GPP TS 33.220 V9.3.0; Generic bootstrapping architecture; Jun. 2010.
Supplementary European Search Report in European application No. 11855388.2, mailed on Feb. 23, 2015.
pCR to secure connection, Jun. 24, 2010.
pCR about the key issure-Secure Connection, Jan. 17, 2011.

KEY SHARING METHOD AND SYSTEM FOR MACHINE TYPE COMMUNICATION (MTC) SERVER

TECHNICAL FIELD

The disclosure relates to a mobile communication system and a Machine Type Communication (MTC) technique, and in particular to a key sharing method and system for an MTC server.

BACKGROUND

The MTC technique is a blanket term for a series of techniques implementing data communication and interaction among machines, as well as between a machine and a human being by applying wireless communication techniques, and combination thereof. The expression "Machine To Machine (M2M)" has two folds of meaning: the first being the machine itself, which is called a smart device in the embedded field; the second being the connection among machines, which connects the machines via a network, thereby making the human life more intelligent. MTC is widely applied, for example in smart measurement, remote monitoring and controlling, tracking, medical treatment and the like. Compared with traditional communications among people, MTC (M2M) devices are large in number, with a wide application field and enormous market prospect.

In the MTC, main long distance connection techniques include: Global System for Mobile Communications (GSM), General Packet Radio Service (GPRS), and Universal Mobile Telecommunications System (UMTS); short distance connection techniques mainly include 802.11b/g, Bluetooth, Zigbee, Radio Frequency Identification (RFID) and the like. As MTC integrates wireless communication and information techniques, it can be used for bidirectional communications, such as long distance information collection, parameter setting and instruction sending, and therefore can implement different application solutions, such as safety monitoring, automatic vending, cargo tracking and the like, with the possibility of almost all devices involved in daily life becoming potential service targets. The MTC provides simple means for device real time data to establish wireless connection among systems, remote devices, or individuals.

GBA refers to a Generic Bootstrapping Architecture, wherein the GBA hierarchy architecture defines a generic key negotiation mechanism between a UE and a server. FIG. 1 is a schematic diagram of the network model of the GBA hierarchy architecture; As shown in FIG. 1, the GBA network model mainly includes the following network elements:

UE (User Equipment): which is the blanket term for a terminal equipment (such as a mobile phone) and a (U) SIM card, and may be a mobile terminal equipment (such as a mobile phone and the like) with a plug-in card, or a fixed terminal equipment (such as a set-top box and the like) with a plug-in card;

NAF (Network Application Function): i.e., an application server, which implements an operation logic function of an application, and provides an operation service for the UE after completing authentication of the UE;

BSF (Bootstrapping Server Function): which is a core network element of the GBA, wherein the BSF implements authentication with the UE via an AKA protocol, and negotiates an application key which is used later on for the communications between the UE and the NAF, and the BSF can set a lifetime of the key according to a local strategy;

HSS (Home Subscriber System): i.e., a Home Subscriber Server, which stores authentication data in the (U) SIM card of the terminal, such as Ki in the SIM card and the like;

SLF: i.e., a Subscription Locator Function, wherein by inquiring from SLF, the BSF acquires the name of the HSS storing related user data. The SLF is not necessary in single HSS environment, nor required when the BSF is configured to use a preset HSS.

After introduction of the MTC device in the mobile communication system, the MTC device may need to communicate with a plurality of MTC servers. In the case where one MTC device communicates with one MTC server, the MTC device may establish a session key with the MTC server via a GBA process and establish a safe connection; However, when the MTC device needs to communicate with a plurality of MTC servers, it is necessary for the communication of the MTC device with a previous MTC server to complete before establishing the safe connection via the GBA process. This limits the ability of the MTC device to perform safe communications simultaneously with a plurality of MTC servers, and reduces the efficiency of network resources.

SUMMARY

In view of this, the main objective of the disclosure is to provide a key sharing method and system for an MTC server, where an MTC device can perform safe communications simultaneously with a plurality of MTC servers, thereby enhancing the efficiency of network resources.

In the disclosure, an MTC operation and an M2M operation all refer to an operation provided by a Machine Type Communication server (MTC server).

To achieve the aforementioned objective, the technical solution of the disclosure is implemented as follows:

A key sharing method for a Machine Type Communication (MTC) server includes:

when an MTC device needs to perform safe communications with a second MTC server while the MTC device establishes a safe connection and performs safe communications with a first MTC server via a Generic Bootstrapping Architecture (GBA) process, sending, by the MTC device, a request message to the second MTC server, wherein the request message contains a bootstrapping identifier (B-TID) currently used by the MTC device and the first MTC server, and a host identifier NAF-ID$_1$ of the first MTC server;

after receiving the request message from the MTC device, sending, by the second MTC server, an authentication request to a Bootstrapping Server Function (BSF), wherein the authentication request contains a host identifier NAF-ID$_2$ of the second MTC server, the B-TID, and the host identifier NAF-ID$_1$ of the first MTC server;

after receiving the authentication request from the second MTC server, generating, by the BSF, a session key $K_{NAF}$ according to the B-TID and the NAF-ID$_1$ included in the authentication request, and sending the generated $K_{NAF}$ to the second MTC server via an authentication request response message.

The authentication request response message may also include security setting information, wherein the security setting information includes bootstrap time and a lifetime of the session key.

The method may further include: after the second MTC server receives the session key $K_{NAF}$, sending, by the second MTC server, a request response message to the MTC device.

The method may further include: before generating a session key $K_{NAF}$ by the BSF according to the B-TID and the NAF-ID$_1$ included in the authentication request, verifying, by the BSF, validity of the MTC server host name NAF-ID$_2$ included in the authentication request, and further verifying the validity of the NAF-ID$_1$.

The method may further include: before generating a session key K$_{NAF}$ by the BSF according to the B-TID and the NAF-ID$_1$ included in the authentication request, determining, by the BSF, whether key sharing of the second MTC server with the first MTC server is allowed, and generating the session key K$_{NAF}$ according to the B-TID and the NAF-ID$_1$ included in the authentication request when said sharing is allowed, wherein the determining whether key sharing of the second MTC server with the first MTC server is allowed by the BSF includes: performing, by the BSF, determination according to a key related sharing relation among MTC servers stored by a Home Subscriber System (HSS), or sending, by the BSF, the NAF-ID$_1$ and the NAF-ID$_2$ to the HSS, and performing determination according to a determination result returned by the HSS.

The MTC server may be located inside or outside a mobile communication network, wherein the mobile communication network includes a 3GPP network and a 3GPP2 network.

A key sharing system for a Machine Type Communication (MTC) server includes an MTC device, a first MTC server, a second MTC server, and a Bootstrapping Server Function (BSF), wherein the MTC device is configured to send a request message to the second MTC server when the MTC device needs to perform safe communications with the second MTC server while the MTC device establishes a safe connection and performs safe communications with the first MTC server via a Generic Bootstrapping Architecture (GBA) process, wherein the request message contains a bootstrapping identifier (B-TID) currently used by the MTC device and the first MTC server, and a host identifier NAF-ID$_1$ of the first MTC server;

the second MTC server is configured to send an authentication request to the BSF after receiving the request message from the MTC device, wherein the authentication request contains a host identifier NAF-ID$_2$ of the second MTC server, the B-TID, and the host identifier NAF-ID$_1$ of the first MTC server; and the BSF is configured to, after receiving the authentication request from the second MTC server, generate a session key K$_{NAF}$ according to the B-TID and the NAF-ID$_1$ included in the authentication request, and to send the generated K$_{NAF}$ to the second MTC server via an authentication request response message.

The authentication request response message sent to the second MTC server by the BSF may further include security setting information, wherein the security setting information includes bootstrap time and a lifetime of the session key.

The second MTC server may be further configured to send a request response message to the MTC device after receiving the session key K$_{NAF}$.

The BSF may be further configured to verify validity of the MTC server host name NAF-ID$_2$ included in the authentication request, and further to verify the validity of the NAF-ID$_1$ before generating a session key K$_{NAF}$ according to the B-TID and the NAF-ID$_1$ included in the authentication request.

The system may further include a Home Subscriber System (HSS), wherein the HSS is configured to store a key related sharing relation among MTC servers; and the BSF is further configured to, before generating a session key K$_{NAF}$ according to the B-TID and the NAF-ID$_1$ included in the authentication request, determine, according to the key related sharing relation among MTC servers stored by the HSS, whether key sharing of the second MTC server with the first MTC server is allowed, and to generate the session key K$_{NAF}$ according to the B-TID and the NAF-ID$_1$ included in the authentication request when said sharing is allowed.

The system may further include a Home Subscriber System (HSS), wherein the HSS is configured to store a key related sharing relation among MTC servers, to determine whether key sharing of the second MTC server with the first MTC server is allowed according to the stored key related sharing relation among MTC servers after receiving the NAF-ID$_1$ and the NAF-ID$_2$ from the BSF, and to return a determination result to the BSF; and the BSF is further configured to, before generating a session key K$_{NAF}$ according to the B-TID and the NAF-ID$_1$ included in the authentication request, send the NAF-ID$_1$ and the NAF-ID$_2$ to the HSS, and to determine, according to the determination result returned by the HSS, whether key sharing of the second MTC server with the first MTC server is allowed, and to generate the session key K$_{NAF}$ according to the B-TID and the NAF-ID$_1$ included in the authentication request when said sharing is allowed.

The MTC server may be located inside or outside a mobile communication network, wherein the mobile communication network includes a 3GPP network and a 3GPP2 network.

With the key sharing method and system for an MTC server of the disclosure, when an MTC device needs to perform safe communications with a second MTC server while the MTC device establishes a safe connection and performs safe communications with a first MTC server via a Generic Bootstrapping Architecture (GBA) process, the MTC device sends the second MTC server a request message containing a bootstrapping identifier (B-TID) currently used by the MTC device and the first MTC server and a host identifier NAF-ID$_1$ of the first MTC server; the second MTC server sends a Bootstrapping Server Function (BSF) an authentication request containing a host identifier NAF-ID$_2$ of the second MTC server, the B-TID, and the host identifier NAF-ID$_1$ of the first MTC server; the BSF generates a session key K$_{NAF}$ according to the B-TID and the NAF-ID$_1$ included in the authentication request, and sends the generated K$_{NAF}$ to the second MTC server via an authentication request response message.

With the disclosure, in the case that the MTC device has established the safe connection with one MTC server and is currently in use, if the MTC device needs to establish the safe connection with a new MTC server via the GBA, the MTC device and the new MTC server do not need to establish any new session key K$_{NAF}$ via one new GBA process, but may enable the MTC device to perform safe communications simultaneously with a plurality of MTC servers via the session key sharing method of the disclosure, enhancing the efficiency of network resources.

DETAILED DESCRIPTION

The basic idea of the disclosure is that: when an MTC device needs to perform safe communications with a second MTC server while the MTC device establishes a safe connection and performs safe communications with a first MTC server via a Generic Bootstrapping Architecture (GBA) process, the MTC device sends the second MTC server a request message containing a bootstrapping identifier (B-TID) currently used by the MTC device and the first MTC server and a host identifier NAF-ID$_1$ of the first MTC server; the second MTC server sends a Bootstrapping Server Function (BSF) an authentication request containing a host identifier NAF-ID$_2$ of the second MTC server, the B-TID, and the host identifier NAF-ID$_1$ of the first MTC server; the BSF generates a session key K$_{NAF}$ according to the B-TID and the NAF-ID$_1$ included in the authentication request, and sends the generated K$_{NAF}$ to the second MTC server via an authentication request response message.

Figure 1:
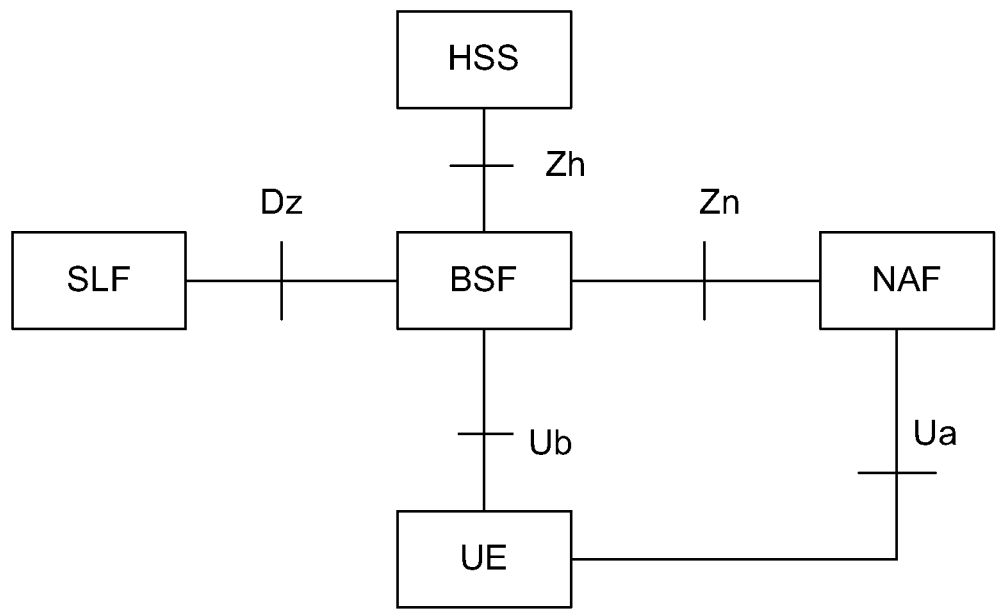
FIG. 1 is a schematic diagram of the network model of the GBA hierarchy architecture.
Figure 2:
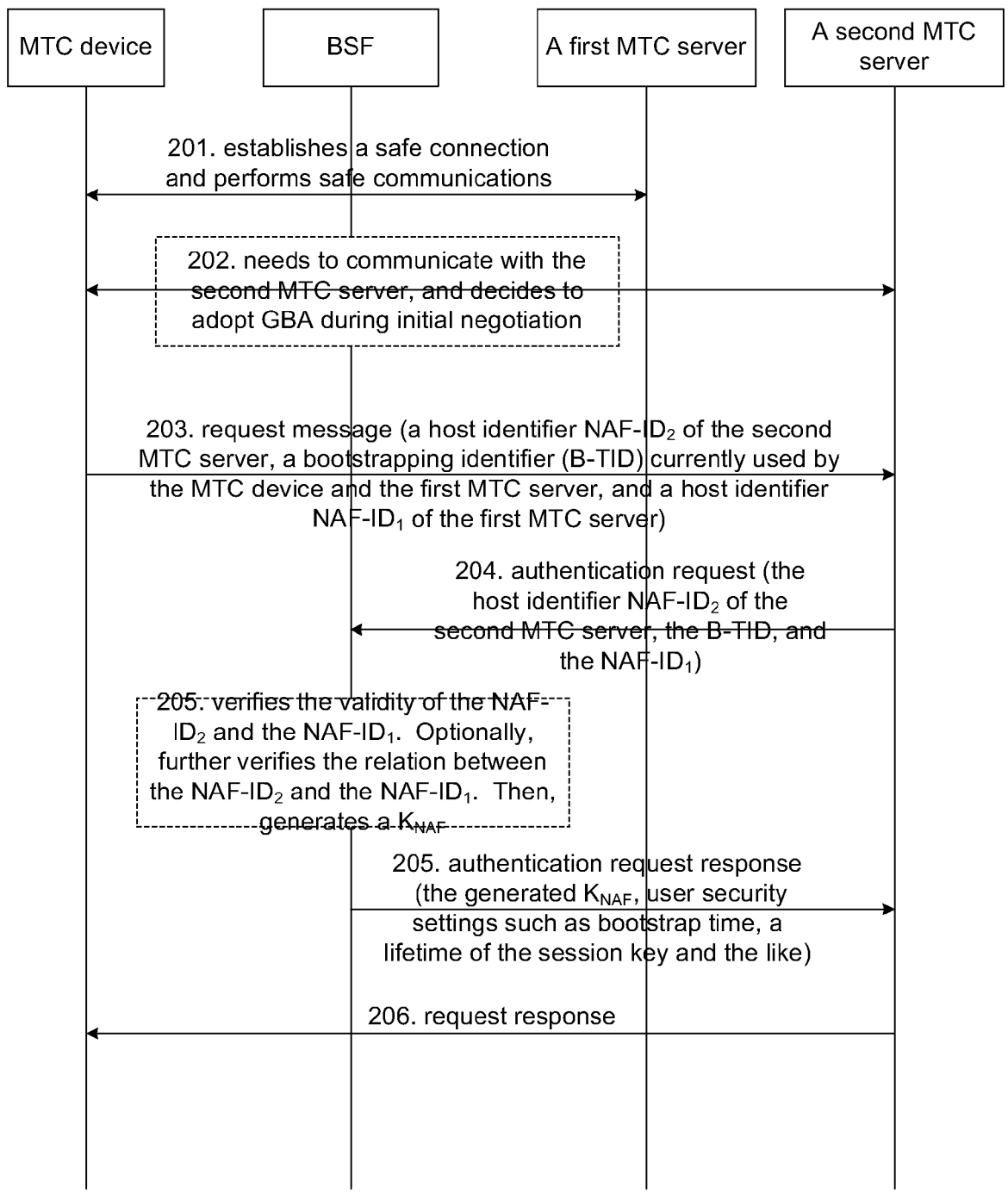
FIG. 2 is a flowchart of a key sharing method for an MTC server of the disclosure.

FIG. 2 is a flowchart of a key sharing method for an MTC server of the disclosure; as shown in FIG. 2, the method includes the following steps:

Step 201: an MTC device establishes a safe connection and performs safe communications with a first MTC server.

Here, when the MTC device needs to communicate with the first MTC server, the MTC device establishes a session key K$_{NAF}$ between the MTC device and the first MTC server via a GBA process.

In the disclosure, the MTC device refers to a device for machine to machine communications in a mobile communication network, the MTC server may be located inside or outside the mobile communication network. In the disclosure, the mobile communication network includes a 3GPP network and a 3GPP2 network.

If the MTC device further needs to communicate with the second MTC server, in the case that the MTC device and the second MTC server decide to adopt the GBA, the method further includes the following steps:

Step 202: The MTC device needs to perform safe communications with the second MTC server, and decides to adopt the GBA.

Step 203: The MTC device sends the second MTC server a request message containing a bootstrapping identifier (B-TID) currently used by the MTC device and the first MTC server and a host identifier NAF-ID$_1$ of the first MTC server.

The request message indicates that the second MTC server is required to use the session key currently used by the MTC device and the first MTC server.

Step 204: After receiving the request message from the MTC device, the second MTC server sends an authentication request to a Bootstrapping Server Function (BSF), wherein the authentication request contains a host identifier NAF-ID$_2$ of the second MTC server, the B-TID, and the host identifier NAF-ID$_1$ of the first MTC server.

The authentication request indicates that the second MTC server requests key data related to B-TID and the host name NAF-ID$_1$ of the first MTC server from the BSF.

Step 205: After receiving the authentication request from the second MTC server, the BSF first verifies the validity of the MTC server host name NAF-ID$_2$ included in the authentication request, and further verifies the validity of the MTC server host name NAF-ID$_1$. Then, the BSF generates a session key K$_{NAF}$ according to the B-TID and the NAF-ID$_1$ included in the authentication request, and sends the generated K$_{NAF}$, together with related security setting information including user security settings such as bootstrap time, a lifetime of the session key and the like, to the second MTC server via an authentication request response message.

Optionally, after verifying the validity of NAF-ID$_2$ and NAF-ID$_1$, the BSF may further verify the relation between NAF-ID$_2$ and NAF-ID$_1$, i.e., determine whether the first MTC server with the host name NAF-ID$_1$ allows the second server with the host name NAF-ID$_2$ to share the session key K$_{NAF}$ currently used by the first MTC server. The determining, by the BSF, whether key sharing of the second MTC server with the first MTC server is allowed may be performed in the following two ways: the BSF performs determination according to a key related sharing relation among MTC servers stored by a HSS, or sends the NAF-ID$_1$ and the NAF-ID$_2$ to the HSS, and performs determination according to a determination result returned by the HSS.

Step 206: The second MTC server sends a request response message to the MTC device after receiving the session key K$_{NAF}$.

Similarly, if the MTC device further needs to communicate with another MTC server, the MTC device may establish a shared session key with the other server according to the aforementioned process.

It can be seen that with the disclosure, after establishing the safe connection with one MTC server A, the MTC device may further establish the safe connection with one new MTC server B; in other words, during establishment of the safe connection of the MTC device with the new MTC server B, if the MTC device has established the safe connection with MTC server A and is currently in use, the MTC device and the new MTC server B do not need to establish any new session key K$_{NAF}$ via one new GBA process, but may share the session key K$_{NAF}$ via the aforementioned steps, thereby enabling the MTC device to perform safe communications simultaneously with a plurality of MTC servers, and enhancing the efficiency of network resources.

The disclosure further proposes accordingly a key sharing system for an MTC server; the system includes an MTC device, a first MTC server, a second MTC server, and a Bootstrapping Server Function (BSF), wherein the MTC device is configured to send a request message to the second MTC server when the MTC device needs to perform safe communications with the second MTC server while the MTC device establishes a safe connection and performs safe communications with the first MTC server via a Generic Bootstrapping Architecture (GBA) process, wherein the request message contains a bootstrapping identifier (B-TID) currently used by the MTC device and the first MTC server and a host identifier NAF-ID$_1$ of the first MTC server;

the second MTC server is configured to send an authentication request to the BSF after receiving the request message from the MTC device, wherein the authentication request contains a host identifier NAF-ID$_2$ of the second MTC server, the B-TID, and the host identifier NAF-ID$_1$ of the first MTC server; and the BSF is configured to, after receiving the authentication request from the second MTC server, generate a session key K$_{NAF}$ according to the B-TID and the NAF-ID$_1$ included in the authentication request, and to send the generated K$_{NAF}$ to the second MTC server via an authentication request response message.

The authentication request response message sent from the BSF to the second MTC server also contains security setting information, which includes bootstrap time and a lifetime of the session key.

The second MTC server is further configured to send a request response message to the MTC device after receiving the session key $K_{NAF}$.

The BSF is further configured to verify the validity of the MTC server host name NAF-ID$_2$ included in the authentication request, and further to verify the validity of the NAF-ID$_1$ before generating a session key $K_{NAF}$ according to the B-TID and the NAF-ID$_1$ included in the authentication request.

The system further includes an HSS configured to store a key related sharing relation among MTC servers; in the system based on the disclosure, the HSS may also store the relation between different MTC servers, i.e., the key sharing relation between MTC servers; for example, the relation between different MTC servers is stored in the form of an MTC server relation list. When the relation between different MTC servers is used for key sharing, the BSF verifies whether the session key may be shared between MTC servers.

Before generating the session key $K_{NAF}$ according to the B-TID and the NAF-ID$_1$ included in the authentication request, the BSF is further configured to determine, according to a key related sharing relation among MTC servers stored by the HSS, whether key sharing of the second MTC server with the first MTC server is allowed, and to generate the session key $K_{NAF}$ according to the B-TID and the NAF-ID$_1$ included in the authentication request if said sharing is allowed.

Alternatively, the system further includes an HSS configured to store a key related sharing relation among MTC servers, to determine whether key sharing of the second MTC server with the first MTC server is allowed according to the stored key related sharing relation among MTC servers after receiving the NAF-ID$_1$ and the NAF-ID$_2$ from the BSF, and to return a determination result to the BSF;

Before generating the session key $K_{NAF}$ according to the B-TID and the NAF-ID$_1$ included in the authentication request, the BSF is further configured to send the NAF-ID$_1$ and the NAF-ID$_2$ to the HSS, to determine, according to the determination result returned by the HSS, whether key sharing of the second MTC server with the first MTC server is allowed, and to generate the session key $K_{NAF}$ according to the B-TID and the NAF-ID$_1$ included in the authentication request if said sharing is allowed.

The MTC server is located inside or outside a mobile communication network including a 3GPP network and a 3GPP2 network.

The aforementioned MTC device refers to a device for machine to machine communications in a mobile communication network, and is a device used by a user for Machine Type Communication, wherein a UICC card is installed in the MTC device, the BSF and the MTC device implement authentication via an AKA protocol, and negotiate the session key that is used later on for communications between the MTC device and an MTC operation server; the BSF can set the lifetime of the key according to a local strategy; the MTC server provide an M2M operation for an MTC user. The MTC server may be located inside or outside the mobile communication network. In the disclosure, the mobile communication network includes the 3GPP network and the 3GPP2 network.

Implementation of the technical solution of the disclosure is further elaborated hereinafter with reference to a specific embodiment.

Embodiment

Figure 3:
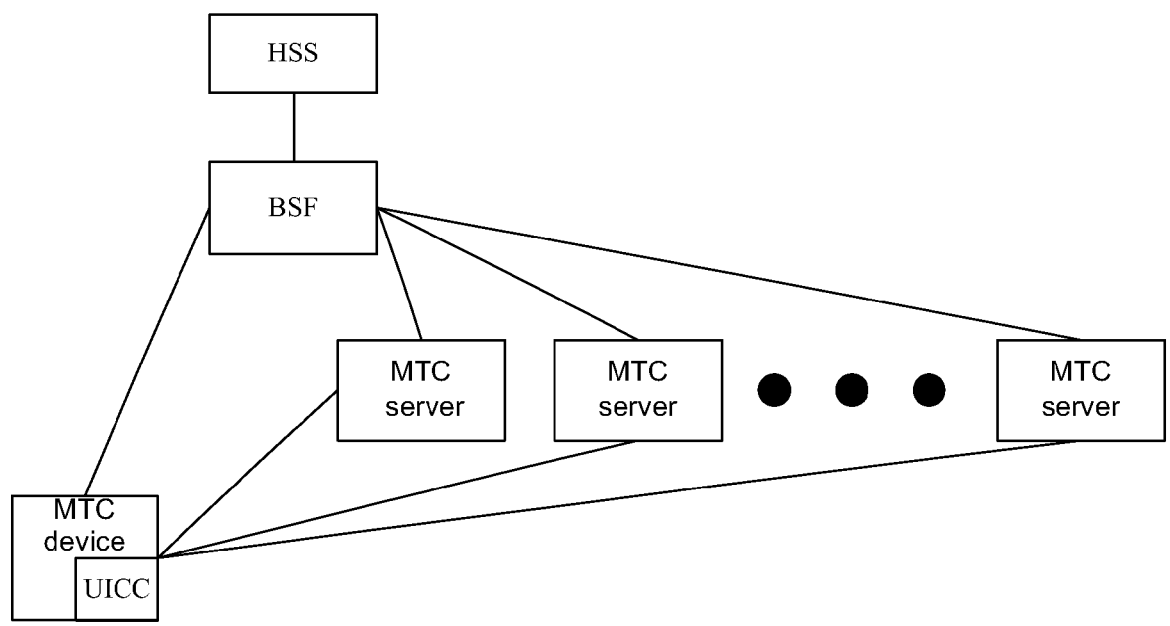
FIG. 3 is a schematic diagram of the architecture of a system for implementing MTC server key sharing in an embodiment of the disclosure.

FIG. 3 is a schematic diagram of the architecture of a system for implementing MTC server key sharing in an embodiment of the disclosure; as shown in FIG. 3, the system includes: an MTC device (used by a user for Machine Type Communication), a user identification card (such as a UICC, normally installed in an MTC device), a BSF (Bootstrapping Server Function) and an MTC server (providing an MTC operation for an MTC user), and an HSS (Home Subscriber System). Wherein, the BSF and the MTC device implement authentication via an AKA protocol, and negotiate the session key $K_{NAF}$ that is used later on for communications between the MTC device and the MTC server, The BSF can set the lifetime of the key according to a local strategy; optionally, in the system based on the disclosure, the HSS may also store the relation between different MTC servers; for example, the relation between different MTC servers is stored in the form of an MTC server relation list. When the relation between different MTC servers is used for key sharing, the BSF verifies whether the session key may be shared between MTC servers.

Figure 4:
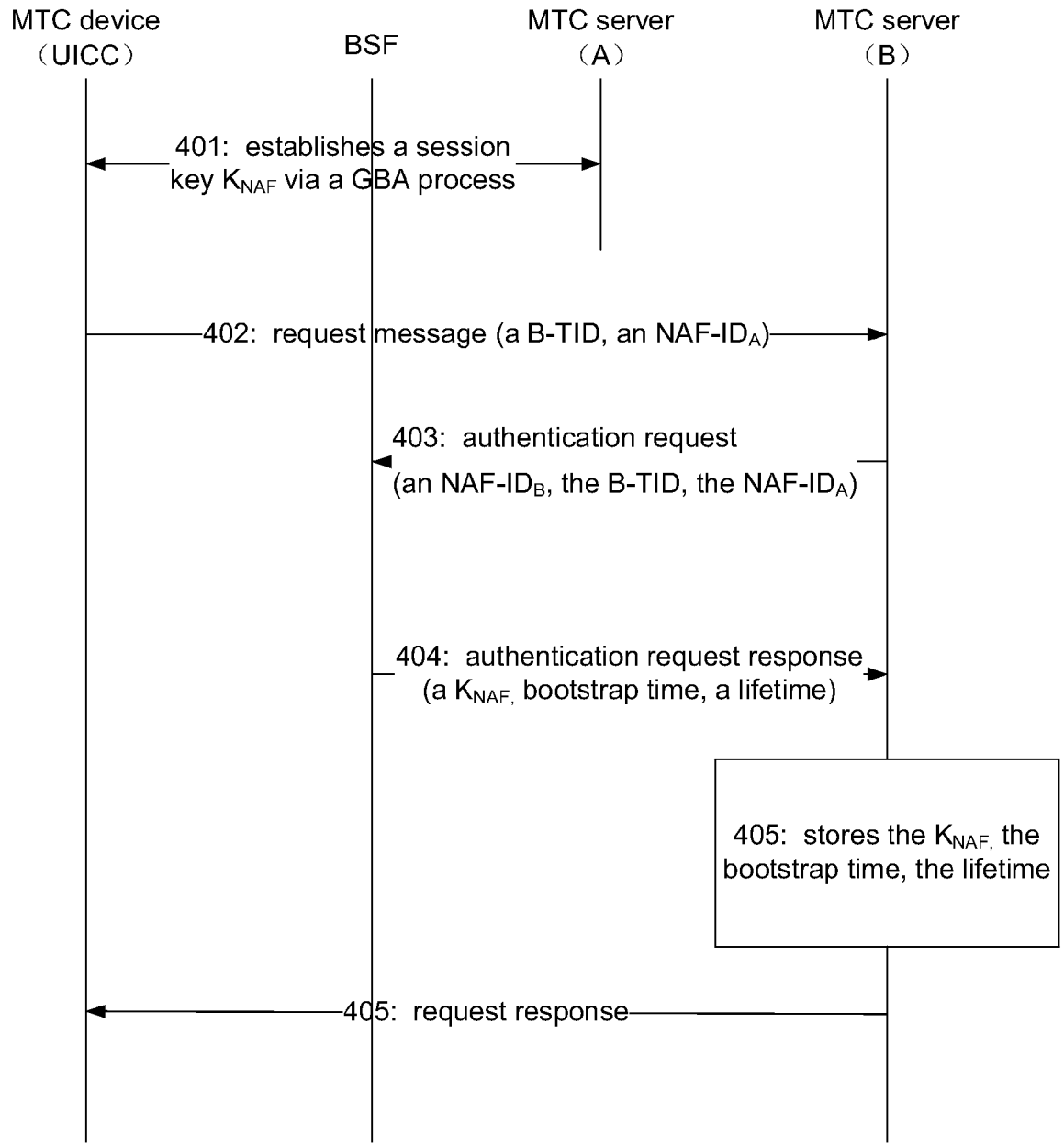
FIG. 4 is a flowchart of a key sharing method for an MTC server in an embodiment of the disclosure.

FIG. 4 is a flowchart of a key sharing method for an MTC server in an embodiment of the disclosure; as shown in FIG. 4, the method specifically includes the following steps.

Step 401: An MTC device establishes a session key $K_{NAF}$ with an MTC server A via a GBA process.

Step 402: The MTC device further needs to communicate with an MTC server B, then, in the case that the MTC device and the MTC server B decide to adopt the way of GBA, the MTC device sends the MTC server B a request message containing a bootstrapping identifier (B-TID) currently used by the MTC device and the MTC server A and a host identifier NAF-ID$_A$ of the MTC server A.

The request message indicates that the MTC server B is required to use the session key currently used by the MTC device and the MTC server A.

Step 403: After receiving the request from the MTC device, the MTC server B sends an authentication request to a BSF, wherein the authentication request information contains a host identifier NAF-ID$_B$ of the MTC server B, the B-TID, and the host identifier NAF-ID$_A$ of the MTC server A.

The request information indicates that the MTC server B requests key data related to B-TID and the host name NAF-ID$_A$ of the MTC server A from the BSF.

Step 404: After receiving the authentication request from the MTC server B, the BSF first verifies the validity of the MTC server host name NAF-ID$_B$. Then, the BSF generates a session key $K_{NAF}$ according to the B-TID and the NAF-ID$_A$, and sends $K_{NAF}$, together with related security setting information including user security settings such as bootstrap time, a lifetime of the session key and the like, to the MTC server B via an authentication request response message.

Step 405: After receiving the authentication request response message, the MTC server B stores information related to the session key, and sends the MTC device a request response message.

What described are merely preferred embodiments of the disclosure and are not intended to limit the scope of the disclosure.

What is claimed is:

1. A key sharing method for a Machine Type Communication (MTC) server, comprising:
   performing, by an MTC device, safe communications with a first MTC server via a Generic Bootstrapping Architecture (GBA) process, wherein a session key $K_{NAF}$ is established between the MTC device and the first MTC server during the safe communications;
   when the MTC device needs to perform safe communications with a second MTC server, sending, by the MTC device, a request message to the second MTC server to request the second MTC server to use the session key $K_{NAF}$ between the MTC device and the first MTC server;
wherein the request message contains a bootstrapping identifier (B-TID) currently used by the MTC device and the first MTC server, and a host identifier NAF-ID$_1$ of the first MTC server;

after receiving the request message from the MTC device, sending, by the second MTC server, an authentication request to a Bootstrapping Server Function (BSF), wherein the authentication request contains a host identifier NAF-ID$_2$ of the second MTC server, the B-TID, and the host identifier NAF-ID$_1$ of the first MTC server;

after receiving the authentication request from the second MTC server, generating, by the BSF, a session key $K_{NAF}$ according to the B-TID and the NAF-ID$_1$ included in the authentication request, and sending the generated $K_{NAF}$ to the second MTC server via an authentication request response message;

after receiving the session key $K_{NAF}$, sending, by the second MTC server, a request response message to the MTC device;

performing, by the MTC device, the safe communications with the second MTC server by using the session key $K_{NAF}$ between the MTC device and the first MTC server while the MTC device performs the safe communications with the first MTC server.

2. The method according to claim 1, wherein the authentication request response message also includes security setting information, wherein the security setting information comprises bootstrap time and a lifetime of the session key.

3. The method according to claim 2, further comprising:
before generating a session key $K_{NAF}$ by the BSF according to the B-TID and the NAF-ID$_1$ included in the authentication request, determining, by the BSF, whether key sharing of the second MTC server with the first MTC server is allowed, and generating the session key $K_{NAF}$ according to the B-TID and the NAF-ID$_1$ included in the authentication request when said sharing is allowed,
wherein the determining whether key sharing of the second MTC server with the first MTC server is allowed by the BSF comprises: performing, by the BSF, determination according to a key related sharing relation among MTC servers stored by a Home Subscriber System (HSS), or sending, by the BSF, the NAF-ID$_1$ and the NAF-ID$_2$ to the HSS, and performing determination according to a determination result returned by the HSS.

4. The method according to claim 1, further comprising:
before generating a session key $K_{NAF}$ by the BSF according to the B-TID and the NAF-ID$_1$ included in the authentication request, verifying, by the BSF, validity of the MTC server host name NAF-ID$_2$ included in the authentication request, and further verifying the validity of the NAF-ID$_1$.

5. The method according to claim 1, further comprising:
before generating a session key $K_{NAF}$ by the BSF according to the B-TID and the NAF-ID$_1$ included in the authentication request, determining, by the BSF, whether key sharing of the second MTC server with the first MTC server is allowed, and generating the session key $K_{NAF}$ according to the B-TID and the NAF-ID$_1$ included in the authentication request when said sharing is allowed,
wherein the determining whether key sharing of the second MTC server with the first MTC server is allowed by the BSF comprises: performing, by the BSF, determination according to a key related sharing relation among MTC servers stored by a Home Subscriber System (HSS), or sending, by the BSF, the NAF-ID$_1$ and the NAF-ID$_2$ to the HSS, and performing determination according to a determination result returned by the HSS.

6. The method according to claim 4, further comprising:
before generating a session key $K_{NAF}$ by the BSF according to the B-TID and the included in the authentication request, determining, by the BSF, whether key sharing of the second MTC server with the first MTC server is allowed, and generating the session key $K_{NAF}$ according to the B-TID and the NAF-ID$_1$ included in the authentication request when said sharing is allowed,
wherein the determining whether key sharing of the second MTC server with the first MTC server is allowed by the BSF comprises: performing, by the BSF, determination according to a key related sharing relation among MTC servers stored by a Home Subscriber System (HSS), or sending, by the BSF, the NAF-ID$_1$ and the NAF-ID$_2$ to the HSS, and performing determination according to a determination result returned by the HSS.

7. A key sharing system for a Machine Type Communication (MTC) server comprising an MTC device, a first MTC server, a second MTC server, and a Bootstrapping Server Function (BSF), wherein
the MTC device is configured to perform safe communications with the first MTC server via a Generic Bootstrapping Architecture (GBA) process, wherein a session key $K_{NAF}$ is established between the MTC device and the first MTC server during the safe communications; and to send a request message to the second MTC server to request the second MTC server to use the session key $K_{NAF}$ between the MTC device and the first MTC server when the MTC device needs to perform safe communications with the second MTC server;
wherein the request message contains a bootstrapping identifier (B-TID) currently used by the MTC device and the first MTC server, and a host identifier NAF-ID$_1$ of the first MTC server;
the second MTC server is configured to send an authentication request to the BSF after receiving the request message from the MTC device, wherein the authentication request contains a host identifier NAF-ID$_2$ of the second MTC server, the B-TID, and the host identifier NAF-ID$_1$ of the first MTC server; and
the BSF is configured to, after receiving the authentication request from the second MTC server, generate a session key $K_{NAF}$ according to the B-TID and the NAF-ID$_1$ included in the authentication request, and to send the generated $K_{NAF}$ to the second MTC server via an authentication request response message;
the second MTC server is further configured to send a request response message to the MTC device after receiving the session key $K_{NAF}$;
the MTC device is further configured to perform the safe communications with the second MTC server by using the session key $K_{NAF}$ between the MTC device and the first MTC server while the MTC device performs the safe communications with the first MTC server.

8. The system according to claim 7, further comprising a Home Subscriber System (HSS), wherein
the HSS is configured to store a key related sharing relation among MTC servers; and
the BSF is further configured to, before generating a session key $K_{NAF}$ according to the B-TID and the NAF-ID$_1$ included in the authentication request, determine, according to the key related sharing relation among MTC servers stored by the HSS, whether key sharing of the second MTC server with the first MTC server is allowed, and to generate the session key $K_{NAF}$ according to the B-TID and the NAF-ID$_1$ included in the authentication request when said sharing is allowed.

9. The system according to claim 7, further comprising a Home Subscriber System (HSS), wherein
the HSS is configured to store a key related sharing relation among MTC servers, to determine whether key sharing of the second MTC server with the first MTC server is allowed according to the stored key related sharing relation among MTC servers after receiving the NAF-ID$_1$ and the NAF-ID$_2$ from the BSF, and to return a determination result to the BSF; and
the BSF is further configured to, before generating a session key K$_{NAF}$ according to the B-TID and the NAF-ID$_1$ included in the authentication request, send the NAF-ID$_1$ and the NAF-ID$_2$ to the HSS, and to determine, according to the determination result returned by the HSS, whether key sharing of the second MTC server with the first MTC server is allowed, and to generate the session key a K$_{NAF}$ ccording to the B-TID and the NAF-ID$_1$ included in the authentication request when said sharing is allowed.

10. The system according to claim 7, wherein the authentication request response message sent to the second MTC server by the BSF further includes security setting information, wherein the security setting information comprises bootstrap time and a lifetime of the session key.

11. The system according to claim 10, further comprising a Home Subscriber System (HSS), wherein
the HSS is configured to store a key related sharing relation among MTC servers; and
the BSF is further configured to, before generating a session key K$_{NAF}$ according to the B-TID and the NAF-ID$_1$ included in the authentication request, determine, according to the key related sharing relation among MTC servers stored by the HSS, whether key sharing of the second MTC server with the first MTC server is allowed, and to generate the session key K$_{NAF}$ according to the B-TID and the NAF-ID$_1$ included in the authentication request when said sharing is allowed.

12. The system according to claim 10, further comprising a Home Subscriber System (HSS), wherein
the HSS is configured to store a key related sharing relation among MTC servers, to determine whether key sharing of the second MTC server with the first MTC server is allowed according to the stored key related sharing relation among MTC servers after receiving the NAF-ID$_1$ and the NAF-ID$_2$ from the BSF, and to return a determination result to the BSF; and
the BSF is further configured to, before generating a session key K$_{NAF}$ according to the B-TID and the NAF-ID$_1$ included in the authentication request, send th NAF-ID$_1$ and the NAF-ID$_2$ to the HSS, and to determine, according to the determination result returned by the HSS, whether key sharing of the second MTC server with the first MTC server is allowed, and to generate the session key K$_{NAF}$ according to the B-TID and the K$_{NAF}$ included in the authentication request when said sharing is allowed.

13. The system according to claim 7, wherein the BSF is further configured to verify validity of the MTC server host name NAF-ID$_2$ included in the authentication request, and further to verify the validity of the NAF-ID$_1$ before generating a session key K$_{NAF}$ according to the B-TID and the NAF-ID$_1$ included in the authentication request.

14. The system according to claim 13, further comprising a Home Subscriber System (HSS), wherein
the HSS is configured to store a key related sharing relation among MTC servers; and
the BSF is further configured to, before generating a session key K$_{NAF}$ according to the B-TID and the NAF-ID$_1$ included in the authentication request, determine, according to the key related sharing relation among MTC servers stored by the HSS, whether key sharing of the second MTC server with the first MTC server is allowed, and to generate the session key K$_{NAF}$ according to the B-TID and the NAF-ID$_1$ included in the authentication request when said sharing is allowed.

15. The system according to claim 13, further comprising a Home Subscriber System (HSS), wherein
the HSS is configured to store a key related sharing relation among MTC servers, to determine whether key sharing of the second MTC server with the first MTC server is allowed according to the stored key related sharing relation among MTC servers after receiving the NAF-ID$_1$ and the NAF-ID$_2$ from the BSF, and to return a determination result to the BSF; and
the BSF is further configured to, before generating a session key K$_{NAF}$ according to the B-TID and the NAF-ID$_1$ included in the authentication request, send the NAF-ID$_1$ and the NAF-ID$_2$ to the HSS, and to determine, according to the determination result returned by the HSS, whether key sharing of the second MTC server with the first MTC server is allowed, and to generate the session key K$_{NAF}$ according to the B-TID and the NAF-ID$_1$ included in the authentication request when said sharing is allowed.

* * * * *